United States Patent Office 2,852,542
Patented Sept. 16, 1958

2,852,542

ACETYLATED METALLO-ORGANIC COMPOUNDS AND THEIR PREPARATION

William M. Sweeney, Hopewell Junction, N. Y., assignor to The Texas Company, New York, N. Y., a corporation of Delaware No Drawing. Application February 29, 1956
Serial No. 568,435

4 Claims. (Cl. 260—429)

The instant invention relates to polyacetyl dicyclopentadienyl-transition element compounds having at least three acetyl groups and process for making same.

Representative of the dicyclopentadienyl reactants useful in the practice of my process is dicyclopentadienyl iron, more commonly called "ferrocene." Heretofore it has been proposed to acetylate ferrocene with acetic anhydride in the presence of hydrofluoric acid. The reaction in this case yields the monoacetyl substance. The use of aluminum chloride catalyst in this reaction yields the diacetyl derivative.

Other dicyclopentadienyl-transition element compounds suitable for the practice of my process include: alkylated ferrocene; substituted dicyclopentadienyl-iron compounds made from a fulvene Grignard reagent and an iron salt as is shown in my copending patent application S. N. 512,873, filed June 2, 1955, entitled "Organometallic Compounds and Process for Producing Same"; and dicyclopentadienyl-iron compounds characterized by a substituted two-carbon atom bridge between a pair of cyclopentadienyl rings as are shown in my copending application S. N. 522,867 of July 18, 1955, also entitled "Organometallic Compounds and Process for Producing Same."

Broadly, my process for said polyacetylation comprises: forming a reaction mixture of the dicyclopentadienyl-iron compound, said compound having not more than two acetyl groups, and acetic anhydride in excess of the stoichiometric amount necessary for formation of the corresponding polyacetyl compound having at least three acetyl groups; heating said reaction mixture at a temperature between 200° and 350° F. in the presence of trifluoroacetic acid until said corresponding polyacetyl compound is formed; and separating said corresponding polyacetyl compound from the reaction mixture.

A particular aspect of my invention is the new compound, tetraacetyl dicyclopentadienyl iron, obtainable by my process. I have found that the trifluoroacetic acid catalyst is specific for such polyacetyl compound formation, this compound being not readily obtained using the conventional HF catalyst or acetyl chloride.

The particular polyacetylated compounds from my process exhibit solubility in both water and hydrocarbon solvents. Because of this and their chemical properties, they provide a means of aqueous-phase corrosion inhibition for, and also a means of bearing soluble metal into mixed aqueous and hydrocarbon systems such as occur in fuel tanks.

Preparation of a variety of suitable reactants for the practice of my process from a fulvene is described in the above-mentioned patent applications. Conventionally dicyclopentadienyl iron can be prepared by the reaction between cyclopentadienyl Grignard reagent and an iron halide, or by the reaction of dicyclopentadienyl sodium or potassium and an iron halide, e. g. ferric chloride, in a medium such as tetrahydrofuran. The cyclopentadienyl reactant can, if desired, be monoacetylated or diacetylated by any prior art method before polyacetylating it by my process, but is preferably unacetylated since use of my process makes such step unnecessary.

In my preparation I use acetic anhydride in excess of the stoichiometric amount necessary for formation of the specific polyacetyl compound from the dicyclopentadienyl-iron compound, generally between 3 and 30 times the stoichiometric amount, to obtain substantial utilization of the metallo-organic reactant in a reasonable reaction period. For example, in reacting dicyclopentadienyl iron to form the tetraacetyl dicyclopentadienyl iron I use at least 12 mols and advantageously about 20 mols of acetic anhydride per mol of dicyclopentadienyl iron charged to the reactor; for efficiency and economy in the practice of the invention I restrict the amount of acetic anhydride in such preparation to not more than about 120 mols and preferably to not more than about 80 mols per mol of dicyclopentadienyl iron. In a similar preparation using monoacetyl ferrocene reactant the amount of acetic anhydride used would be between 9 and 90 mols per mol of the metallo-organic reactant. The excess anhydride acts as a convenient reaction vehicle, but diluents such as alkanes which are not readily acetylated, e. g. $C_{10}$–$C_{15}$ alkanes, can also be added to the reaction mixture if desired.

The mol fraction of trifluoroacetic acid needed in the reaction mixture to be effective for the polyacetylation is broadly from about 0.005 or even less, and need not be above 0.2. Preferably such mol fracton is from 0.02 to 0.05.

In order to achieve effective polyacetylation in a reasonable time the temperature of the reaction mixture should not be substantially below about 200° F. Temperatures of 350° F. and higher can be used because of the thermal stability of the reactants and product. Advantageously, however, the reaction can be conducted at least in its initial stages under total reflux at the atmospheric boiling point of the reaction mixture which ordinarily will be about in the range of 280° to 300° F.

Elevated pressure is not necessary but can be desirable to maintain liquid phase conditions in the reactor at a temperature above the atmospheric boiling point of the reaction mixture. Operation at atmospheric pressure is preferred, but higher and lower pressures can be used if desired. Mechanical agitation can also be used. Generally, at least one-half hour of reaction time is needed under preferred conditions to assure economic utilization of reactants, and 1 to 6 hours is preferable in this regard.

While the cyclopentadienyl nucleus of ferrocene has five possible positions for acetylation and the iron compounds shown in S. N. 512,873 and S. N. 522,867 have four, it is unlikely that exhaustive acetylation of all these positions is practical using my process. Tetraacetylation, however, can be obtained readily, and, with temperatures toward the lower end of the above range, e. g. 200–350° F., and/or short reaction times such as ½–2 hours, a substantial proportion of tri acetylated product can be formed in the reaction mixture. While it is conceivable that other lower fatty acid anhydrides such as propionic anhydride could be substituted for acetic anhydride in my process, the prospects of obtaining as much as tri- or tetrasubstitution in any large proportion as compared to mono- or disubstitution are not as good as with acetic anhydride.

Separation of the product is done conveniently by diluting the reaction mixture with water, then extracting the product from the resulting mixture with a hydrocarbon, e. g. benzene or toluene. For economy in the operation one can strip off the bulk of the unreacted acetic anhydride and the trifluoroacetic acid catalyst from the reaction mixture by distillation, e. g. at atmospheric pressure or under reduced pressure with or without inert gas blowing, before diluting the reaction mixture with water.

When atmospheric pressure distillation is used, the previous reaction period can be shortened somewhat as such distillation involves additional heating of the mixture. The hydrocarbon solution can be neutralized, dried and the solvent evaporated to leave the product as residue. Because of the corrosive nature of the substances handled, materials of construction used in the process are preferably glass, glass-lined steel, porcelain and the like.

The following equations are given to assist in understanding the invention but are not to be construed as limiting it. In Equation 1 ferrocene is used; in Equation 2 2,3-dimethyl, 2,3-bis (1' cyclopentadienyl) iron-butane is used; in Equation 3 the reaction product of iron chloride and the adduct of ethyl Grignard reagent with dimethyl fulvene is used.

(1)
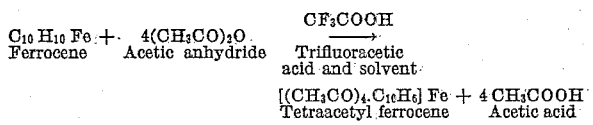

(2)
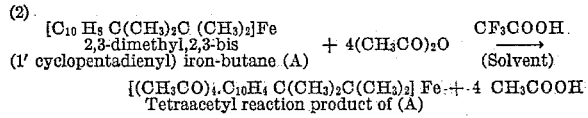

(3)
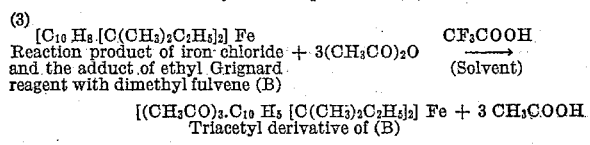

Even under prolonged drastic reaction conditions acetylation of alkyl groups on the products of Equations 2 and 3, above, is unlikely. The acetylation is believed to occur preferentially on the cyclopentadienyl nuclei. If, however, one or more of such alkyl substituents on the cyclopentadienyl nuclei are replaced by an aromatic radical such as phenyl, acetylation can occur on both the cyclopentadienyl nuclei and such aromatic radical. Accordingly, ample acetic anhydride should be used in the reaction mixture in such cases.

Where the metallo-organic reactant has dienyl nuclei as are described in S. N. 512,873 and S. N. 522,867, acetylation can be expected to occur on such nuclei in the same manner as it occurs on the cyclopentadienyl nuclei of ferrocene. Tertiary alkyl amino substituent groups on side chains from cyclopentadienyl nuclei, e. g. as in 2,3-diethylamino methyl-2,3-bis (1' cyclopentadienyl) iron butane, resist acetylation as do alkyl substituents, but corresponding primary and secondary amino substituents will acetylate readily.

The polyacetylated product of my invention can be catalytically reduced with hydrogen or by other methods for example, with hydrazine, to provide a corresponding polyalkyl material useful in hydrocarbon fuels as an antiknock and/or smoke suppression additive.

The points of attachment of the multiple acetyl radicals to the two cyclopentadienyl nuclei of the polyacetylated product are not known with exactness, but it is believed that symmetrical acetyl substitution is likely to occur far more readily than unsymmetrical substitution when the product has an even number of acetyl groups.

The preparation of tetraacetyl ferrocene by my method is shown below. Herein all parts are parts by weight and all percentages are weight percentages.

A reaction mixture was formed from 9.3 parts of ferrocene and 433 parts of acetic anhydride into which was blended 11.4 parts of trifluoroacetic acid. The mixture was then boiled under reflux at atmospheric pressure for five hours. The reaction mixture turned deeply purple in color. It was diluted with water, then extracted with benzene. The benzene solution was washed with aqueous 5% sodium carbonate, then with water, dried and the solvent evaporated leaving purple crystals of crude tetraacetyl ferrocene having a melting point of 72° C.

One part of the crystalline tetraacetyl ferrocene was added to an aqueous solution of 2.5 parts of hydroxylamine hydrochloride and 1.09 parts of sodium hydroxide plus sufficient ethanol to facilitate rapid solution of the crystals. This mixture was warmed on a steam bath for ten minutes, then cooled in an ice bath to precipitate crystals of the corresponding oxime having melting point of 149° C. and analyzing to the composition of $Fe(C_{18}H_{22}O_4N_4)$ with 52.4% carbon and 5.3% hydrogen as compared to a calculated composition of 52.2% carbon and 5.3% hydrogen.

Obviously, many modifications and variations of the invention, as hereinbefore set forth, may be made without departing from the spirit and scope thereof, and therefore only such limitations should be imposed as are indicated in the appended claims.

I claim:

1. A process for making a polyacetyl dicyclopentadienyl iron compound having 3 to 4 acetyl groups attached to nuclear carbon atoms which comprises: forming a reaction mixture of a dicyclopentadienyl iron compound, said compound having not more than two acetyl groups attached to nuclear carbon atoms, and acetic anhydride in excess of the stoichiometric amount necessary for formation of said polyacetyl compound; heating said reaction mixture at a temperature between 200° and 350° F. in the presence of trifluoroacetic acid until said polyacetyl compound is formed; and separating said polyacetyl compound from the reaction mixture.

2. The process of claim 1 wherein the quantity of acetic anhydride is 3–30 times the stoichiometric amount; the mol fraction of trifluoroacetic acid in the reaction mixture is from about 0.005 to about 0.2, and the reaction mixture is heated for at least one-half hour.

3. The process of claim 2 wherein the dicyclopentadienyl reactant is dicyclopentadienyl iron.

4. Tetraacetyldicyclopentadienyl iron.

References Cited in the file of this patent

Woodward et al.: "Jour. Am. Chem. Soc.," vol. 74, July 5, 1952, pages 3458–9.

UNITED STATES PATENT OFFICE
CERTIFICATE OF CORRECTION

Patent No. 2,852,542                                   September 16, 1958

William M. Sweeney

It is hereby certified that error appears in the printed specification of the above numbered patent requiring correction and that the said Letters Patent should read as corrected below.

Column 2, line 28, for "fracton" read -- fraction --; column 3, line 44, for "dienyl" read -- indenyl --.

Signed and sealed this 25th day of November 1958.

(SEAL)
Attest:

KARL H. AXLINE
Attesting Officer

ROBERT C. WATSON
Commissioner of Patents